(12) United States Patent
Takahashi

(10) Patent No.: US 10,392,052 B2
(45) Date of Patent: Aug. 27, 2019

(54) VEHICLE FRAMEWORK STRUCTURE

(71) Applicant: TOYOTA JIDOSHA KABUSHIKI KAISHA, Toyota-shi, Aichi-ken (JP)

(72) Inventor: Naoki Takahashi, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/787,326

(22) Filed: Oct. 18, 2017

(65) Prior Publication Data
US 2018/0162448 A1 Jun. 14, 2018

(30) Foreign Application Priority Data

Dec. 9, 2016 (JP) .................................. 2016-239805

(51) Int. Cl.
*B62D 21/07* (2006.01)
*B62D 21/15* (2006.01)
*B62D 25/20* (2006.01)

(52) U.S. Cl.
CPC ............. *B62D 21/07* (2013.01); *B62D 21/15* (2013.01); *B62D 25/20* (2013.01)

(58) Field of Classification Search
CPC ......... B62D 21/07; B62D 21/15; B62D 25/20
USPC .. 296/29, 204, 205, 203.02, 203.03, 203.04, 296/187.12
See application file for complete search history.

(56) References Cited

U.S. PATENT DOCUMENTS

| | | | | |
|---|---|---|---|---|
| 2,964,331 A | * | 12/1960 | Sherman | B62D 21/07 280/790 |
| 5,320,403 A | * | 6/1994 | Kazyak | B62D 23/005 296/203.01 |
| 6,547,318 B2 | * | 4/2003 | Takeuchi | B62D 25/082 296/193.01 |
| 2010/0171340 A1 | | 7/2010 | Yasuhara et al. | |
| 2013/0206496 A1 | | 8/2013 | Hashimoto | |
| 2015/0298744 A1 | * | 10/2015 | Winberg | B62D 27/023 296/187.09 |

FOREIGN PATENT DOCUMENTS

| | | |
|---|---|---|
| JP | H07-237427 A | 9/1995 |
| JP | H09-301216 A | 11/1997 |
| JP | 2000-103356 A | 4/2000 |
| JP | 2007-106320 A | 4/2007 |

(Continued)

*Primary Examiner* — Joseph D. Pape
(74) *Attorney, Agent, or Firm* — Oliff PLC

(57) ABSTRACT

The present disclosure presents a vehicle framework structure, which comprises: a front frame that configures a part of a framework of a vehicle front section; a rear frame that configures a part of a framework of a vehicle rear section; an intermediate frame that configures a part of a framework of a vehicle intermediate section, and that includes a framework member disposed between the front frame and the rear frame and having a length direction in a vehicle front-rear direction; and a coupling section that includes a first configuration member attached to the framework member of the intermediate frame so as to be continuous with the framework member in the vehicle front-rear direction, and a second configuration member attached to the first configuration member so as to be continuous with the first configuration member in the vehicle front-rear direction.

11 Claims, 10 Drawing Sheets

(56) References Cited

FOREIGN PATENT DOCUMENTS

| JP | 2009-018725 A | 1/2009 |
| JP | 2011-111141 A | 6/2011 |
| JP | 2015-123838 A | 7/2015 |

\* cited by examiner

VEHICLE FRAMEWORK STRUCTURE

CROSS-REFERENCE TO RELATED APPLICATION

This application is based on and claims priority under 35 USC 119 from Japanese Patent Application No. 2016-239805 filed on Dec. 9, 2016, the disclosure of which is incorporated by reference herein.

BACKGROUND

Technical Field

The present invention relates to a vehicle framework structure.

Related Art

Japanese Patent Application Laid-Open (JP-A) No. 2007-106320 describes a vehicle frame structure. The frame structure includes a front frame configuring framework at a vehicle front section, a rear frame configuring framework at a vehicle rear section, and an intermediate frame configuring framework between the front frame and the rear frame. A uniform portion capable of selectively changing length in a vehicle front-rear direction can be attached to one vehicle front-rear direction end portion of the front frame and the rear frame.

The vehicle framework can accordingly be easily lengthened or shortened in the vehicle front-rear direction, thereby enabling common framework to be employed in vehicles using different power units or vehicles of different sizes.

SUMMARY

However, in the case of electric vehicles employing a motor as a power unit, the configuration does not require a muffler, transmission, or propeller shaft, and there is therefore no need to provide a floor panel with a floor tunnel in which to dispose such elements. In cases in which no floor tunnel is present, the bending rigidity of the floor panel is reduced, and so collision load concentrates in the vehicle framework in a vehicle collision. Accordingly, in the configuration described in JP-A No. 2007-106320, there is a possibility that collision load might concentrate between the uniform portion and the intermediate frame in a vehicle collision, hindering the smooth transmission of load to elsewhere in the framework. The related art described above therefore leaves room for improvement regarding this point.

In consideration of the above circumstances, an object of the present invention is to obtain a vehicle framework structure capable of improving load transmission efficiency in a vehicle body structure not provided with a floor tunnel.

A vehicle framework structure of a first aspect includes a front frame, a rear frame, an intermediate frame, and a coupling section. The front frame configures part of a framework of a vehicle front section. The rear frame configures part of a framework of a vehicle rear section. The intermediate frame configures part of a framework of a vehicle intermediate section, and includes a framework member disposed between the front frame and the rear frame and having a length direction in a vehicle front-rear direction. The coupling section includes a first configuration member attached to the framework member of the intermediate frame so as to be continuous with the framework member in the vehicle front-rear direction, and a second configuration member attached to the first configuration member so as to be continuous with the first configuration member in the vehicle front-rear direction. The coupling section couples at least one of the front frame or the rear frame to the intermediate frame in the vehicle front-rear direction by joining a leading end portion of the first configuration member to a leading end portion of the second configuration member opposing the leading end portion of the first configuration member. Both the first configuration member and the second configuration member are formed so as to gradually increase in size in at least one of a vehicle width direction or a vehicle vertical direction on progression from respective base end portions of the first configuration member and the second configuration member toward the respective leading end portions of the first configuration member and the second configuration member.

According to the first aspect, the coupling section is capable of coupling the front frame configuring part of the framework of the vehicle front section and the intermediate frame configuring part of the framework of the vehicle intermediate section together in the vehicle front-rear direction. Similarly, the coupling section is capable of coupling the rear frame configuring part of the framework of the vehicle rear section and the intermediate frame together in the vehicle front-rear direction. The coupling section includes the first configuration member that is attached so as to be continuous with the framework member of the intermediate frame in the vehicle front-rear direction, and the second configuration member that is attached so as to be continuous with the first configuration member in the vehicle front-rear direction. This thereby enables stress to be suppressed from concentrating between the intermediate frame and the first configuration member and between the front frame or the rear frame and the second configuration member. Moreover, the leading end portion of the first configuration member and the leading end portion of the second configuration member opposing the leading end portion of the of the first configuration member are joined together, thus respectively coupling at least one of the front frame or the rear frame to the intermediate frame in the vehicle front-rear direction.

Note that the first configuration member and the second configuration member are each formed so as to gradually increase in size in at least one of the vehicle width direction and the vehicle vertical direction on progression from the respective base end portions of the first configuration member and the second configuration member toward the respective leading end portions of the first configuration member and the second configuration member. Namely, the location (the respective leading end portions) where the first configuration member and the second configuration member are joined together is configured with larger dimensions in at least one of the vehicle width direction and the vehicle vertical direction than other locations, thereby improving the ability to withstand input load. This thereby enables input load to be transmitted smoothly to elsewhere in the framework.

A vehicle framework structure of a second aspect is the first aspect, wherein the intermediate frame includes a pair of left and right rockers extending along the vehicle front-rear direction, and a cross member coupling the pair of left and right rockers together in the vehicle width direction via the first configuration member of the coupling section.

According to the second aspect, the intermediate frame includes the rockers extending along the vehicle front-rear direction and the cross member coupling the rockers together in the vehicle width direction via the first configuration member of the coupling section. Accordingly, load input to the intermediate frame from the coupling section can be transmitted smoothly to both the rockers and the cross member by the first configuration member.

Note that here, "via the first configuration member" includes not only a configuration in which the rockers and the cross member are separated from one another due to the first configuration member being present between the rocker and the cross member, but also configurations in which a rocker and the cross member are in a directly joined together state, with the join being covered by the first configuration member.

A vehicle framework structure according to a third aspect is the second aspect, wherein a location where the first configuration member of the coupling section is joined to one of the pair of left and right rockers, and a location where the first configuration member of the coupling section is joined to the cross member, are configured as a single body.

According to the third aspect, in the coupling section, the location where the first configuration member is joined to the rocker and the location where the first configuration member is joined to the cross member are configured as a single body, so as not to form a join where stress is liable to concentrate between the rocker and the cross member. This thereby enables stress to be suppressed from concentrating in the first configuration member.

A vehicle framework structure according to a fourth aspect is any one of the first aspect to the third aspect of the present invention, wherein in the coupling section, at least one ridge line, of plural ridge lines extending along the vehicle front-rear direction in the vicinity of the leading end portion of the first configuration member, is disposed so as to be continuous with at least one ridge line of plural ridge lines extending along the vehicle front-rear direction in the vicinity of the leading end portion of the second configuration member.

According to the fourth aspect, at least one ridge line of the plural ridge lines extending along the vehicle front-rear direction in the vicinity of the leading end portion of the first configuration member of the coupling section is disposed so as to be continuous with at least one ridge line of the plural ridge lines extending along the vehicle front-rear direction in the vicinity of the leading end portion of the second configuration member. Accordingly, when load is input to the coupling section along the vehicle front-rear direction, the load can be transmitted smoothly from the first configuration member to the second configuration member or from the second configuration member to the first configuration member, along the ridge lines that have high bending rigidity.

Note that here, "continuously" includes both configurations in which there is no gap present between the ridge line of the first configuration member and the ridge line of the second configuration member, and configurations in which a gap is present between the ridge line of the first configuration member and the ridge line of the second configuration member.

A vehicle framework structure according to a fifth aspect is any one of the first aspect to the fourth aspect of the present invention, wherein, in a vehicle front view of the coupling section, at least one ridge line, of plural ridge lines within a face of the leading end portion of the first configuration member that is a face opposing the second configuration member, is disposed so as to be substantially superimposed on at least one ridge line of plural ridge lines within a face of the leading end portion of the second configuration member that is a face opposing the first configuration member.

According to the fifth aspect, in a vehicle front view of the coupling section, at least one ridge line of the plural ridge lines within the face of the leading end portion of the first configuration member that is a face opposing the second configuration member is disposed so as to be substantially superimposed on at least one ridge line of the plural ridge lines within the face of the leading end portion of the second configuration member that is a face opposing the first configuration member. Accordingly, when load is input to the coupling section along the vehicle front-rear direction, the load can be transmitted smoothly from the first configuration member to the second configuration member or from the second configuration member to the first configuration member, along the ridge lines that have high bending rigidity.

A vehicle framework structure according to a sixth aspect is of any one of the first aspect to the fifth aspect of the present invention, wherein the first configuration member and the second configuration member of the coupling section are each formed with a rib extending along the vehicle front-rear direction, and the rib of the first configuration member and the rib of the second configuration member are disposed so as to be substantially superimposed on each other in a vehicle front view.

According to the sixth aspect, the first configuration member and the second configuration member of the coupling section are each formed with a rib extending along the vehicle front-rear direction. The respective ribs are disposed so as to be substantially superimposed on each other in vehicle front view. Accordingly, when load is input to the coupling section along the vehicle front-rear direction, load input from one of the ribs is borne by the other of the ribs, thereby enabling the load to be more reliably transmitted.

A vehicle framework structure according to a seventh aspect is of any one of the first aspect to the sixth aspect of the present invention, wherein at least one of the first configuration member or the second configuration member of the coupling section is provided with a projection that projects out toward the other out of the first configuration member or the second configuration member, and that overlaps the other out of the first configuration member or the second configuration member in the vehicle width direction.

According to the seventh aspect, the projection is provided to at least one of the first configuration member or the second configuration member of the coupling section. The projection projects out toward the other out of the first configuration member or the second configuration member of the coupling section, and overlaps the other out of the first configuration member or the second configuration member in the vehicle width direction. Accordingly, when load is input into either the first configuration member or the second configuration member substantially along the vehicle width direction, the load can be transmitted to the other out of the first configuration member or the second configuration member.

A vehicle framework structure according to an eighth aspect is of any one of the first aspect to the seventh aspect of the present invention, wherein the coupling section is formed with at least one of a hollow portion or an opening.

According to the eighth aspect, the coupling section is formed with at least one of a hollow portion or an opening, thereby enabling a reduction in weight of the coupling section.

A vehicle framework structure according to a ninth aspect is the eighth aspect, wherein a portion of a suspension arm is inserted into the at least one of a hollow portion or an opening.

According to the ninth aspect, a portion of the suspension arm is inserted into the at least one of a hollow portion or an opening in the coupling section, thereby enabling space to be saved in the vehicle.

A vehicle framework structure according to a tenth aspect is of any one of the first aspect to the ninth aspect of the present invention, wherein a fitting portion is formed at one of the first configuration member or the second configuration member of the coupling section, and a fitted-to portion is formed at the other of the first configuration member or the second configuration member, with the fitting portion being fitted to the fitted-to portion by being inserted into the fitted-to portion in the vehicle front-rear direction.

According to the tenth aspect, in the coupling section, the fitting portion is formed at one of the first configuration member or the second configuration member, and the fitted-to portion is formed at the other of the first configuration member or the second configuration member. The fitting portion is fitted to the fitted-to portion by being inserted into the fitted-to portion in the vehicle front-rear direction. Accordingly, when connecting the first configuration member and the second configuration member together, positioning of the first configuration member and the second configuration member can be performed easily by inserting the fitting portion into the fitted-to portion. Moreover, since it is possible for load to be transmitted either from the fitting portion to the fitted-to portion or from the fitted-to portion to the fitting portion, when load is input to one of the first configuration member or the second configuration member substantially along the vehicle vertical direction or substantially along the vehicle width direction, the load can be better transmitted to the other out of the first configuration member or the second configuration member.

A vehicle framework structure according to an eleventh aspect is of any one of the first aspect to the tenth aspect of the present invention, wherein at least one of the first configuration member or the second configuration member of the coupling section is formed as a single body with at least one of the front frame or the rear frame.

According to the eleventh aspect, at least one of the first configuration member or the second configuration member of the coupling section is formed as a single body with at least one of the front frame or the rear frame, thus rendering an operation to attach the second configuration member the at least one of the front frame or the rear frame unnecessary. A reduction in the number of assembly processes can accordingly be achieved.

A vehicle framework structure according to a twelfth aspect is any one of the first aspect to the eleventh aspect of the present invention, wherein at least one ridge line of plural ridge lines provided at the coupling section is configured so as to be continuous with at least one ridge line of plural ridge lines provided at either the front frame or the rear frame.

According to the twelfth aspect, at least one ridge line of the plural ridge lines provided at the coupling section is configured so as to be continuous with at least one ridge line of the plural ridge lines provided at either the front frame or the rear frame. This thereby enables load to be transmitted between the front frame or the rear frame and the intermediate frame along the ridge lines that have high bending rigidity.

A vehicle framework structure according to a thirteenth aspect is of any one of the first aspect to the twelfth aspect of the present invention, wherein the first configuration member and the second configuration member of the coupling section are fastened together using a fastener.

According to the thirteenth aspect, the first configuration member and the second configuration member of the coupling section are fastened together using a fastener. Accordingly, joining the first configuration member and the second configuration member together is easier than in cases in which welding is employed.

The vehicle framework structure according to the first aspect exhibits the excellent advantageous effect of enabling load transmission efficiency to be improved in a vehicle body structure not provided with a floor tunnel.

The vehicle framework structure according to the second aspect exhibits the excellent advantageous effect of enabling input load to be dispersed such that the load is borne by the overall framework.

The vehicle framework structure according to the third aspect to the sixth aspect and the twelfth aspect exhibits the excellent advantageous effect of enabling load transmission efficiency to be improved in a vehicle body structure not provided with a floor tunnel.

The vehicle framework structure according to the seventh aspect exhibits the excellent advantageous effect of enabling shear deformation to be suppressed in the coupling section.

The vehicle framework structure according to the eighth aspect exhibits the excellent advantageous effect of enabling a reduction in weight to be achieved.

The vehicle framework structure according to the ninth aspect exhibits the excellent advantageous effect of enabling efficient utilization of space in the vehicle.

The vehicle framework structure according to the tenth aspect exhibits the excellent advantageous effect of enabling load transmission efficiency to be improved with respect to load input in any direction in a vehicle body structure not provided with a floor tunnel.

The vehicle framework structure according to the eleventh aspect and the thirteenth aspect exhibits the excellent advantageous effect of enabling an improvement in productivity.

BRIEF DESCRIPTION OF THE DRAWINGS

Exemplary embodiments of the present invention will be described in detail based on the following figures, wherein.

DETAILED DESCRIPTION

First Exemplary Embodiment

Explanation follows regarding a first exemplary embodiment of a vehicle framework structure according to the present invention, with reference to FIG. 1 to FIG. 6. Note that in the respective drawings, the arrow FR indicates the front in the vehicle front-rear direction, the arrow OUT indicates the vehicle width direction outer side, and the arrow UP indicates upward in the vehicle vertical direction.

Figure 1:
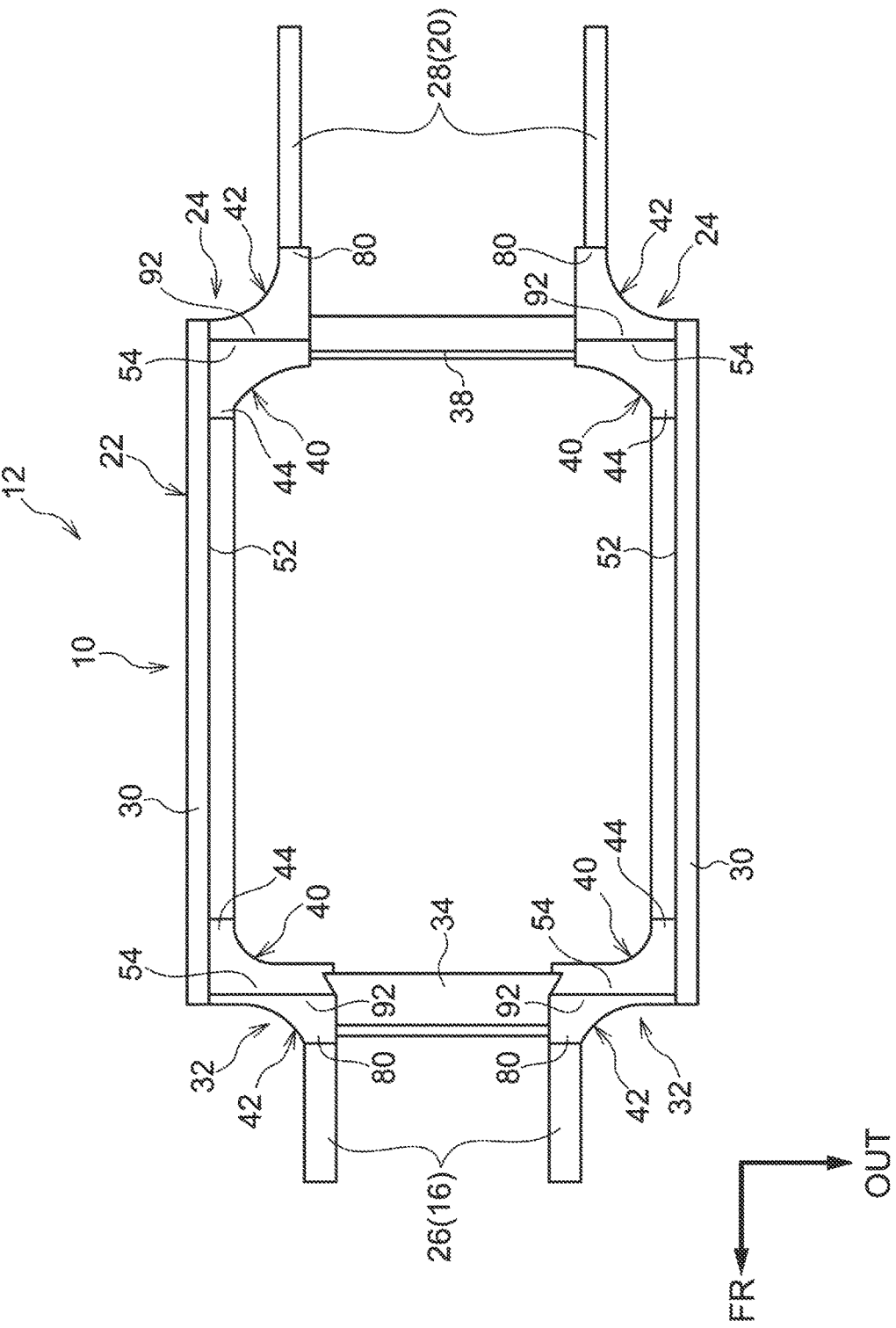
FIG. 1 is a schematic plan view illustrating a vehicle framework structure according to a first exemplary embodiment.

As illustrated in FIG. 1, a vehicle 12 provided with a vehicle framework structure 10 includes a front frame 16, a rear frame 20, an intermediate frame 22, and coupling sections 24, 32, each located at a vehicle lower side of a floor panel, not illustrated in the drawings. The front frame 16 configures part of the framework of a front section of the vehicle 12, and specifically, is configured including a pair of left and right front-side members 26 extending along the vehicle front-rear direction. A power unit and a front suspension member (neither of which are illustrated in the drawings) are attached to the front frame 16. Note that in the present exemplary embodiment, the floor panel of the vehicle 12 has a configuration that does not include a floor tunnel extending along the vehicle front-rear direction.

The rear frame 20 configures part of the framework of a rear section of the vehicle 12, and specifically, is configured including a pair of left and right rear-side members 28 extending along the vehicle front-rear direction. A trunk floor panel 18 (see FIG. 2) is attached to the rear frame 20 from the vehicle upper side.

The intermediate frame 22 configures part of the framework of an intermediate section of the vehicle 12, and is disposed between the front frame 16 and the rear frame 20. Specifically, the intermediate frame 22 is configured including a pair of left and right rockers 30 serving as framework members extending along the vehicle front-rear direction, a front cross member 34 serving as a cross member extending in the vehicle width direction and coupling vehicle front end portions of the pair of left and right rockers 30 together in the vehicle width direction via the coupling sections 32, and a rear cross member 38 serving as a cross member extending in the vehicle width direction and coupling vehicle rear end portions of the pair of left and right rockers 30 together in the vehicle width direction via the coupling sections 24. Note that in plan view of the vehicle, the pair of left and right rockers 30 are disposed at the vehicle width direction outer sides of the front frame 16 and the rear frame 20. Configuration may also be made in which the rockers 30 are joined directly to the front cross member 34 and the rear cross member 38, with the joins being covered by first configuration members 40.

Figure 2:
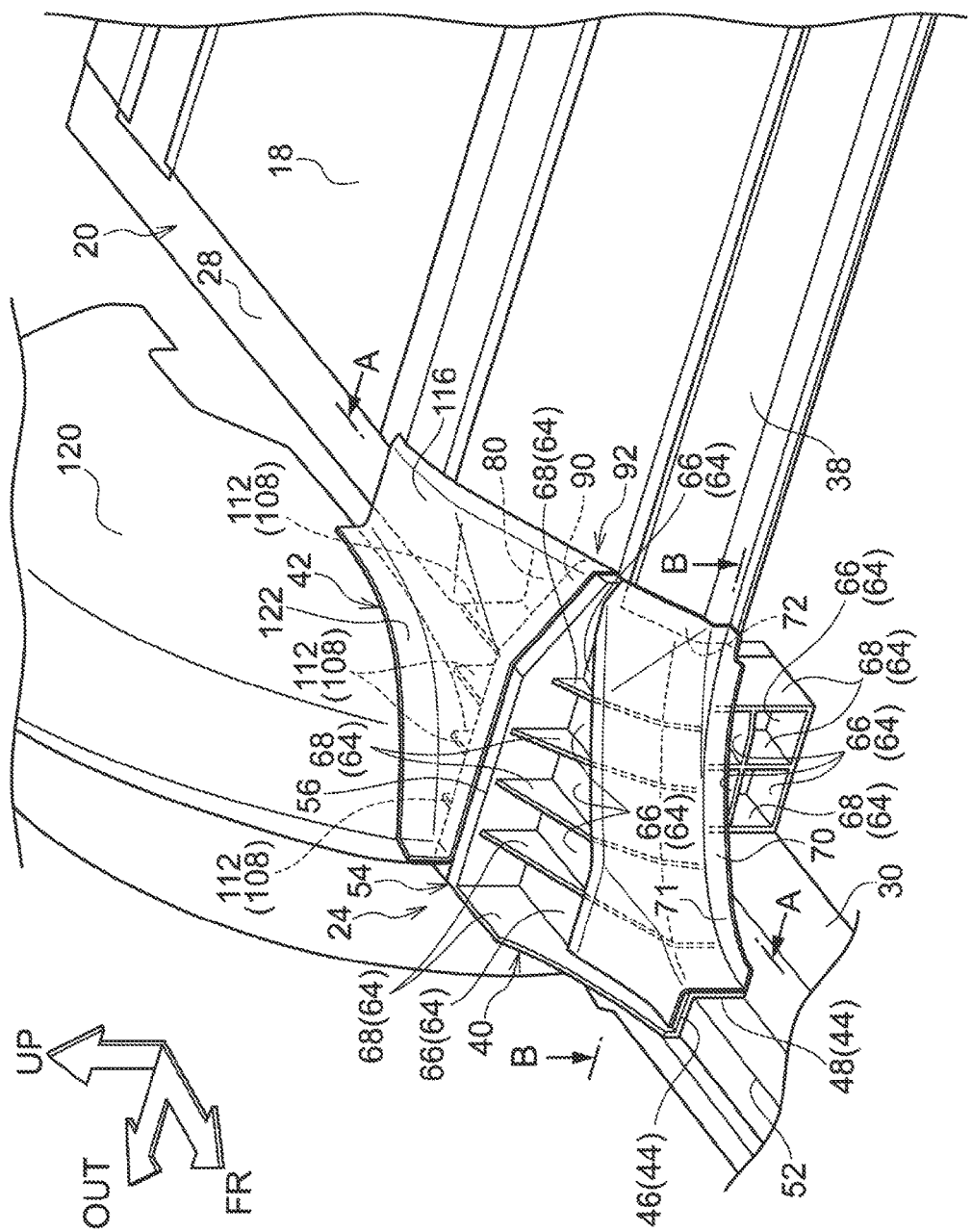
FIG. 2 is a perspective view illustrating relevant portions of a vehicle framework structure according to the first exemplary embodiment, in a state viewing from the vehicle front toward the vehicle rear.

As illustrated in FIG. 2, each coupling section 24 is configured including a first configuration member 40 and a second configuration member 42. The first configuration member 40 is disposed on the intermediate frame 22 side and is formed by casting so as to have a substantially L-shaped profile in plan view of the vehicle. A base end portion 44 configuring a vehicle front side of the first configuration member 40 is formed with a substantially L-shaped profile in vehicle front view by a horizontal wall portion 46 with a plate thickness direction in the vehicle vertical direction, and a vertical wall portion 48 with a plate thickness direction in the vehicle width direction. The base end portion 44 is connected to the rocker 30 in a state in which a ridge line, not illustrated in the drawings, formed between the horizontal wall portion 46 and the vertical wall portion 48 of the base end portion 44 is substantially superimposed on a ridge line 52 on an upper face of the rocker 30. Namely, the first configuration member 40 is attached to the rocker 30 so as to be continuous thereto along the vehicle front-rear direction. Note that the coupling sections 24 according to the present exemplary embodiment are configured so as to basically have left-right symmetry to each other (left-right symmetry about a vehicle front-rear direction line passing through an intermediate location in the vehicle width direction). FIG. 2 accordingly illustrates one side in the vehicle width direction (on the right of the vehicle), and the following explanation primarily focuses on the one side in the vehicle width direction. Moreover, the coupling sections 32 (see FIG. 1) according to the present exemplary embodiment are configured so as to basically have front-rear symmetry to the coupling sections 24 (front-rear symmetry about a vehicle width direction line passing through an intermediate location in the vehicle front-rear direction), and so detailed explanation thereof will be omitted.

Figure 4:
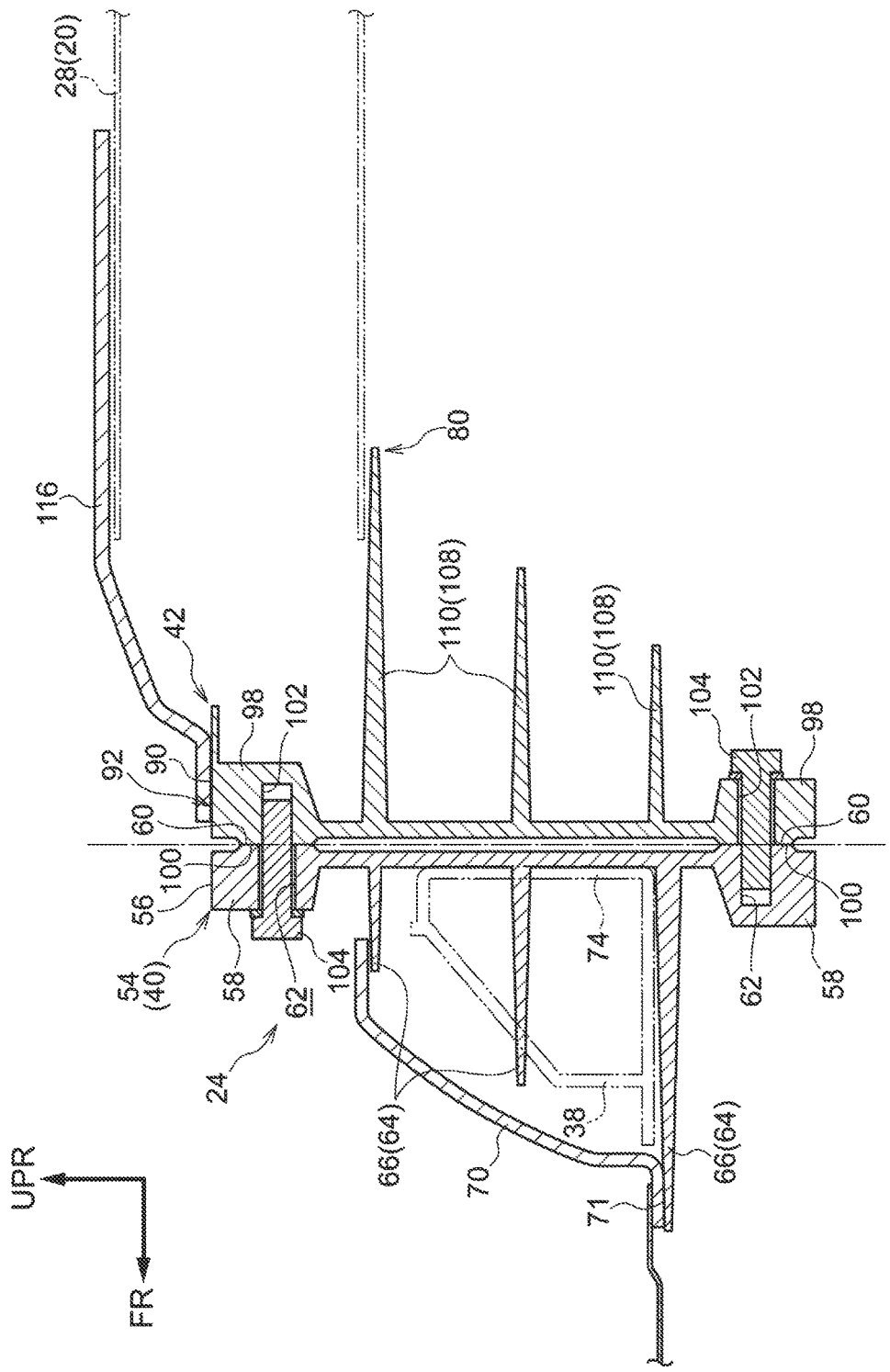
FIG. 4 is an enlarged cross-section illustrating a state sectioned along line A-A in FIG. 2.

As illustrated in FIG. 4, a leading end portion 54 on the opposite side of the first configuration member 40 to the base end portion 44 is configured including a joining wall portion 56 with a plate thickness direction in the vehicle front-rear direction. In vehicle front view, the joining wall portion 56 is set with larger dimensions in the vehicle vertical direction and the vehicle width direction than the base end portion 44 (see FIG. 2). The base end portion 44 and the leading end portion 54 (joining wall portion 56) are integrally formed as a single member, with no join present therebetween.

Moreover, plural fastening portions 58 are respectively formed at a vehicle upper end portion and a vehicle lower end portion of the joining wall portion 56. Each fastening portion 58 has a greater plate thickness than the plate thickness of the joining wall portion 56 at locations other than the fastening portions 58. Accordingly, a vehicle rear face 60 of each fastening portion 58 projects out toward the vehicle rear with respect to the locations of the joining wall portion 56 other than the fastening portions 58.

Each fastening portion 58 of the joining wall portion 56 is formed with a fastening hole 62 with an axial direction along the plate thickness direction. The fastening holes 62 in the fastening portions 58 formed at the vehicle upper end portion of the joining wall portion 56 are, for example, through holes penetrating the fastening portions 58 in the plate thickness direction. The fastening holes 62 of the fastening portions 58 formed at the vehicle lower end portion of the joining wall portion 56 are, for example, non-penetrating holes that are open toward the vehicle rear.

Figure 5:
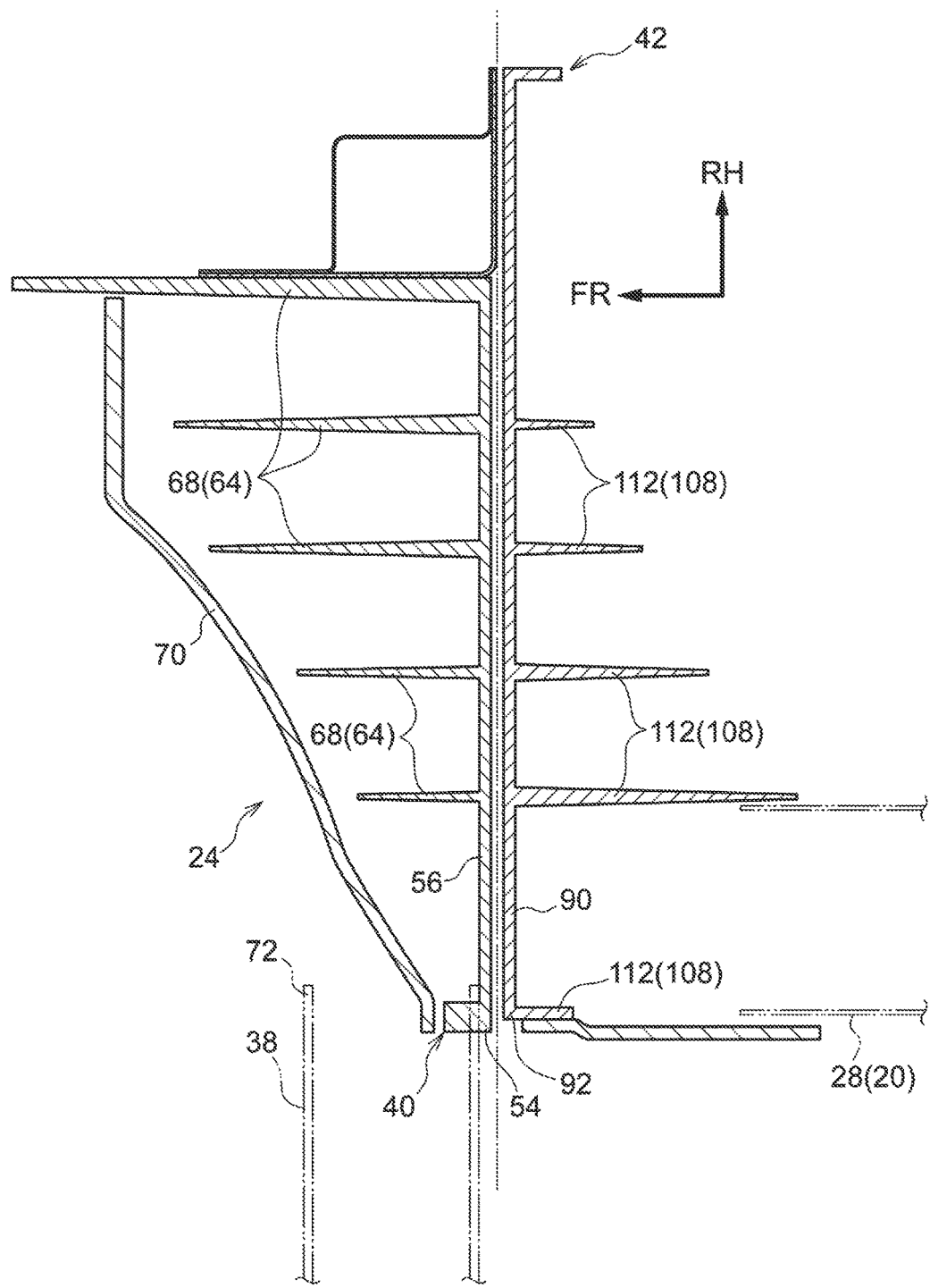
FIG. 5 is an enlarged cross-section illustrating a state sectioned along line B-B in FIG. 2.

The joining wall portion 56 is formed with ribs 64 running toward the vehicle front. The ribs 64 are configured by plural first ribs 66, each with a plate thickness direction in the vehicle vertical direction, and, as illustrated in FIG. 2, plural second ribs 68, each with a plate thickness direction in the vehicle width direction. Each of the plural first ribs 66 are disposed discretely to one another, and each of the plural second ribs 68 are disposed discretely to one another. Accordingly, in vehicle front view, the first ribs 66 and the second ribs 68 are disposed in a lattice pattern. Note that leading end portions of the plural first ribs 66 are respectively curved such that in plan view of the vehicle, the leading end portions of the first ribs 66 are positioned further toward the vehicle rear on progression toward the vehicle width direction inner side. Moreover, as illustrated in FIG. 5, leading end portions of the plural second ribs 68 are also positioned further toward the vehicle rear on progression toward the vehicle width direction inner side so as to correspond to the leading end portions of the first ribs 66. Moreover, a first cover member 70 that curves so as to span from the base end portion 44 to the cross member is attached to the first configuration member 40 so as to partially follow the leading end portions of the plural first ribs 66 and partially follow of the leading end portions of the plural second ribs 68. Due to the above configuration, the first configuration member 40 is formed so as to gradually increase in size in the vehicle width direction and the vehicle vertical direction on progression from the base end portion 44 toward the leading end portion 54 (joining wall portion 56). Note that a vehicle lower side end portion of the first cover member 70 is integrally formed with a flange 71 extending along a substantially horizontal direction and toward the vehicle front.

Moreover, as illustrated in FIG. 2, a length direction end portion 72 of the rear cross member 38 is connected to a vehicle width direction inner side of the joining wall portion 56. Specifically, a rear vertical wall portion 74 of the rear cross member 38 is connected to a vehicle front face of the joining wall portion 56 (see FIG. 5). Note that the first cover member 70 is connected to the length direction end portion 72 of the rear cross member 38 from the vehicle front and the vehicle upper side.

Figure 3:
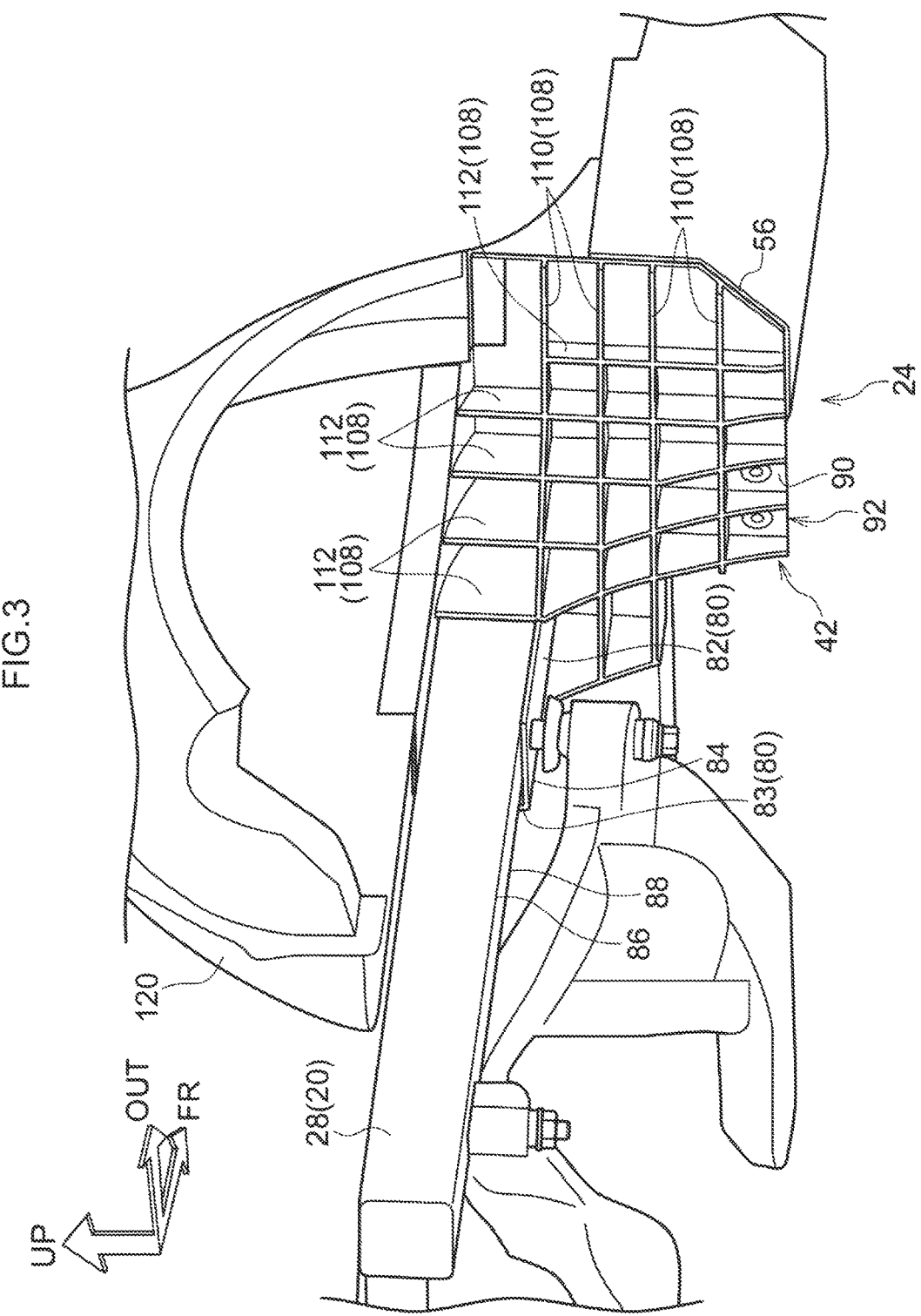
FIG. 3 is a perspective view illustrating relevant portions of a vehicle framework structure according to the first exemplary embodiment, in a state viewing from the vehicle rear toward the vehicle front.

The second configuration member 42 is attached to the first configuration member 40 so as to be continuous thereto along the vehicle front-rear direction. Specifically, at each coupling section 24, the second configuration member 42 is disposed at the vehicle rear of the first configuration member 40. Moreover, at each coupling section 32, the second configuration member 42 is disposed at the vehicle front of the first configuration member 40 (see FIG. 1). The second configuration member 42 is formed by casting so as to have a substantially L-shaped profile in plan view of the vehicle. As illustrated in FIG. 3, a base end portion 80 configuring a vehicle rear side of the second configuration member 42 is formed with a substantially L-shaped profile in vehicle front view by a horizontal wall portion 82 with a plate thickness direction in the vehicle vertical direction, and a vertical wall portion 83 with a plate thickness direction in the vehicle width direction. The rear frame 20 is connected to the base end portion 80 in a state in which a ridge line 84 between the horizontal wall portion 82 and the vertical wall portion 83 of the base end portion 80 is substantially superimposed on a ridge line 88 at a lower face 86 of the rear frame 20. Namely, the ridge line 84 of the second configuration member 42 (the coupling section 24) is configured so as to be continuous with the ridge line 88 of the rear frame 20 in the vehicle front-rear direction. Note that in the coupling sections 32, the ridge line 84 of the second configuration member 42 (the coupling section 32) is configured so as to be continuous in the vehicle front-rear direction to a non-illustrated ridge line of the front frame 16, so as to be symmetrical to the coupling sections 24 in the vehicle front-rear direction.

Similarly to in the first configuration member 40, a leading end portion 92 on the opposite side of the second configuration member 42 to the base end portion 80 is configured including a joining wall portion 90 with a plate thickness direction in the vehicle front-rear direction. The joining wall portion 90 is formed in substantially the same shape as the joining wall portion 56 of the first configuration member 40 in vehicle front view (see also FIG. 2). Moreover, in vehicle front view, the joining wall portion 90 of the second configuration member 42 is set with larger dimensions in the vehicle vertical direction and the vehicle width direction than the base end portion 80. Moreover, as illustrated in FIG. 4, plural fastening portions 98 corresponding to the respective fastening portions 58 of the first configuration member 40 are formed at a vehicle upper end portion and a vehicle lower end portion of the joining wall portion 90. Each of the fastening portions 98 has a greater plate thickness than the plate thickness of the joining wall portion 90 at locations other than the fastening portions 98. Accordingly, a vehicle front face 100 of each fastening portion 98 projects out toward the vehicle front with respect to the locations of the joining wall portion 90 other than the fastening portions 98.

The fastening portions 98 of the joining wall portion 90 are each formed with a fastening hole 102 having an axial direction along the plate thickness direction. The fastening holes 102 of the fastening portions 98 formed at the vehicle upper end portion of the joining wall portion 90 are, for example, non-penetrating holes open toward the vehicle front, and the fastening holes 102 of the fastening portions 98 formed at the vehicle lower end portion of the joining wall portion 90 are, for example, through holes penetrating the fastening portions 98 in the plate thickness direction. Fasteners 104 are inserted into the fastening portions 98 formed at the vehicle lower end portion of the joining wall portion 90 from the vehicle rear, and are screwed together with the fastening portions 58 formed at the vehicle lower end portion of the joining wall portion 56 of the first configuration member 40. Similarly, fasteners 104 are inserted into the fastening portions 58 formed at the vehicle upper end portion of the joining wall portion 56 of the first configuration member 40 from the vehicle front, and are screwed together with the fastening portions 98 formed at the vehicle upper end portion of the joining wall portion 90. The first configuration member 40 and the second configuration member 42 are thereby fastened together. Note that some ridge lines of plural ridge lines extending along the vehicle front-rear direction of the joining wall portion 56 of the first configuration member 40 are disposed so as to be continuous with some ridge lines of plural ridge lines extending along the vehicle front-rear direction of the joining wall portion 90 of the opposing second configuration member 42. Moreover, in vehicle front view, some ridge lines of plural ridge lines within the face (vehicle rear face) of the joining wall portion 56 of the first configuration member 40 that is a face opposing the second configuration member 42 are disposed so as to be superimposed on some ridge lines of plural ridge lines within the face (vehicle front face) of the joining wall portion 90 of the second configuration member 42 that is a face opposing the first configuration member 40. In other words, some of the ridge lines within the vehicle rear face of the joining wall portion 56 are disposed so as to oppose some of the ridge lines within the vehicle front face of the joining wall portion 90 in the vehicle front-rear direction.

The joining wall portion 90 is formed with ribs 108 running toward the vehicle rear. The ribs 108 are configured by plural first ribs 110 with a plate thickness direction in the vehicle vertical direction and plural second ribs 112 (see FIG. 2 and FIG. 3) with a plate thickness direction in the vehicle width direction. Each of the plural first ribs 110 are disposed discretely to one another, and each of the plural second ribs 112 are disposed discretely to one another. Moreover, the plural first ribs 110 and the plural second ribs 112 are disposed so as to be substantially superimposed on the first ribs 66 and the second ribs 68 of the first configuration member 40 in vehicle front view (see also FIG. 5). Accordingly, in vehicle front view, the first ribs 110 and the second ribs 112 are disposed in a lattice pattern. Note that as illustrated in FIG. 3, leading end portions of the plural first ribs 110 are respectively curved such that in plan view of the vehicle, the leading end portions of the plural first ribs 110 are positioned further toward the vehicle front on progression toward the vehicle width direction outer side. Moreover, as illustrated in FIG. 5, leading end portions of the plural second ribs 112 are also positioned further toward the vehicle front on progression toward the vehicle width direction outer side so as to correspond to the leading end portions of the first ribs 110. Namely, the second configuration member 42 is formed so as to gradually increase in size in the vehicle width direction and the vehicle vertical direction on progression from the base end portion 80 toward the leading end portion 92 (joining wall portion 90).

A second cover member 116 is provided to the second configuration member 42 so as to cover the second configuration member 42 from the vehicle upper side. The second cover member 116 is configured from a plate member with a plate thickness direction in the vehicle vertical direction. As illustrated in FIG. 2, a vehicle width direction inner side end portion of the second cover member 116 is disposed so as to substantially follow the vehicle front-rear direction from a vehicle width direction inner side end portion of the joining wall portion 90. Moreover, vehicle width direction outer side end portions of the respective second configuration members 42 follow vehicle width direction inner side faces of a pair of left and right wheel houses 120 provided at the vehicle width direction outer sides of the rear frame 20. Note that a vehicle width direction inner side end portion of the second cover member 116 is integrally formed with a flange 122 that follows the vehicle width direction inner side face of the wheel house 120 and stands up toward the vehicle upper side.

Operation and Advantageous Effects of the First Exemplary Embodiment

Explanation follows regarding operation and advantageous effects of the present exemplary embodiment.

As illustrated in FIG. 1, in the present exemplary embodiment, the coupling sections 32 are capable of coupling the front frame 16 configuring part of the framework of the vehicle front section and the intermediate frame 22 configuring part of the framework of the vehicle intermediate section together in the vehicle front-rear direction. Similarly, the coupling sections 24 are capable of coupling the rear frame 20 configuring part of the framework of the vehicle rear section and the intermediate frame 22 together in the vehicle front-rear direction. The coupling sections 24, 32 each include the first configuration member 40 that is attached so as to be continuous with the rocker 30 of the intermediate frame 22 in the vehicle front-rear direction, and the second configuration member 42 that is attached so as to be continuous with the first configuration member 40 in the vehicle front-rear direction. This thereby enables stress to be suppressed from concentrating between the intermediate frame 22 and the first configuration member 40 and between the front frame 16 or the rear frame 20 and the second configuration member 42. Moreover, the leading end portion 54 of the first configuration member 40 and the leading end portion 92 of the second configuration member 42 opposing the leading end portion 54 of the first configuration member 40 are joined together, thus respectively coupling the front frame 16 or the rear frame 20 to the intermediate frame 22 in the vehicle front-rear direction.

Note that the first configuration member 40 and the second configuration member 42 are respectively formed so as to gradually increase in size along at least one of the vehicle width direction and the vehicle vertical direction on progression from the base end portions 44, 80 toward the leading end portions 54, 92. Namely, the location where the first configuration member 40 and the second configuration member 42 are joined together is configured with larger dimensions in the vehicle width direction and the vehicle vertical direction than other locations, thereby improving the ability to withstand input load. This thereby enables input load to be transmitted smoothly to elsewhere in the framework. Load transmission efficiency can accordingly be improved in a vehicle body structure not provided with a floor tunnel.

Moreover, the intermediate frame 22 includes the rockers 30 extending along the vehicle front-rear direction, and the front cross member 34 and the rear cross member 38 that respectively couple the rockers 30 together in the vehicle width direction via the first configuration members 40 of the coupling sections 24, 32. Accordingly, load input to the intermediate frame 22 from the coupling sections 24, 32 can be transmitted smoothly to both the rockers 30 and the front cross member 34 or the rear cross member 38 by the first configuration member 40. This thereby enables input load to be dispersed such that the load is borne by the overall framework.

Moreover, in each of the coupling sections 24, 32, the location where the first configuration member 40 is joined to the rocker 30 and the location where the first configuration member 40 is joined to the front cross member 34 or to the rear cross member 38 are configured as a single body, so as not to form a join where stress is liable to concentrate between the rocker 30 and the front cross member 34 or the rear cross member 38. This thereby enables stress to be suppressed from concentrating in the first configuration members 40, and therefore in the coupling sections 24, 32.

Furthermore, in each of the coupling sections 24, 32, at least one ridge line of the plural ridge lines extending in the vehicle front-rear direction in the vicinity of the leading end portion 54 of the first configuration member 40 is disposed so as to be continuous with at least one ridge line of the plural ridge lines extending in the vehicle front-rear direction in the vicinity of the leading end portion 92 of the second configuration member 42. Accordingly, when load is input to the coupling sections 24, 32 along the vehicle front-rear direction, the load can be transmitted smoothly from the first configuration member 40 to the second configuration member 42 or from the second configuration member 42 to the first configuration member 40, along the ridge lines that have high bending rigidity.

Moreover, in each of the coupling sections 24, 32, in vehicle front view, at least one ridge line of the plural ridge lines within the face of the leading end portion 54 of the first configuration member 40 that is a face opposing the second configuration member 42 is disposed so as to be substantially superimposed on at least one ridge line of the plural ridge lines within the face of the leading end portion 92 of the second configuration member 42 that is a face opposing the first configuration member 40. Accordingly, when load is input to the coupling sections 24, 32 along the vehicle front-rear direction, the load can be transmitted smoothly from the first configuration member 40 to the second configuration member 42 or from the second configuration member 42 to the first configuration member 40, along the ridge lines that have high bending rigidity. This thereby enables a further improvement to load transmission efficiency in a vehicle body structure not provided with a floor tunnel.

Moreover, in each of the coupling sections 24, 32, the first configuration member 40 and the second configuration member 42 are respectively formed with the ribs 64, 108 that extend along the vehicle front-rear direction. The respective ribs 64, 108 are disposed so as to be substantially superimposed on one another in vehicle front view. Accordingly, when load is input to the coupling sections 24, 32 along the vehicle front-rear direction, load input from one of the ribs 64 or the ribs 108 is borne by the other out of the ribs 64 or the ribs 108, thereby enabling the load to be more reliably transmitted.

Moreover, at least one ridge line of the plural ridge lines provided at the coupling sections 24, 32 is configured so as to be continuous with at least one ridge line of the plural ridge lines provided at the front frame 16 or the rear frame 20 in the vehicle front-rear direction, such that load can be transmitted from the front frame 16 or the rear frame 20 to the intermediate frame 22, or from the intermediate frame 22 to the front frame 16 or the rear frame 20, along the ridge lines that have high bending rigidity. This thereby enables a further improvement in load transmission efficiency in a vehicle body structure not provided with a floor tunnel.

Moreover, in each of the coupling sections 24, 32, since the first configuration member 40 and the second configuration member 42 are fastened together using the fasteners 104, joining the first configuration member 40 and second configuration member 42 together is easier than in cases in which welding is employed. This thereby enables an improvement in productivity.

Note that in the first exemplary embodiment described above, the ribs 64 and the ribs 108 are disposed so as to be substantially superimposed on each other in vehicle front view. However, there is no limitation thereto, and the ribs 64 and the ribs 108 may be disposed at positions that are not superimposed on each other.

Moreover, the first configuration member 40 and the second configuration member 42 are fastened together using the fasteners 104. However, there is no limitation thereto, and configuration may be made in which the first configuration member 40 and the second configuration member 42 are joined together using another type of fastening, such as rivets, or are joined together by welding.

Moreover, configuration is made in which the rocker 30 and either the front cross member 34 or the rear cross member 38 are attached to each first configuration member 40. However, there is no limitation thereto, and configuration may be made in which only the rocker 30 is attached to the first configuration member 40, or configuration may be made in which only either the front cross member 34 or the rear cross member 38 is attached to the first configuration member 40. Further, each of the coupling sections 24, 32 is configured such that the joining wall portion 56 of the first configuration member 40 is joined to the joining wall portion 90 of the second configuration member 42. However there is no limitation thereto, and configuration may be made in which one length direction end portion of the rocker 30 is joined to one length direction end portion of either the front-side member 26 or the rear-side member 28, with reinforcement members having an outer profile increasing in size on progression toward an end portion being provided at respective outer peripheral faces of the respective one length direction end portions, and these reinforcement members being joined together.

MODIFIED EXAMPLE

Figure 6:
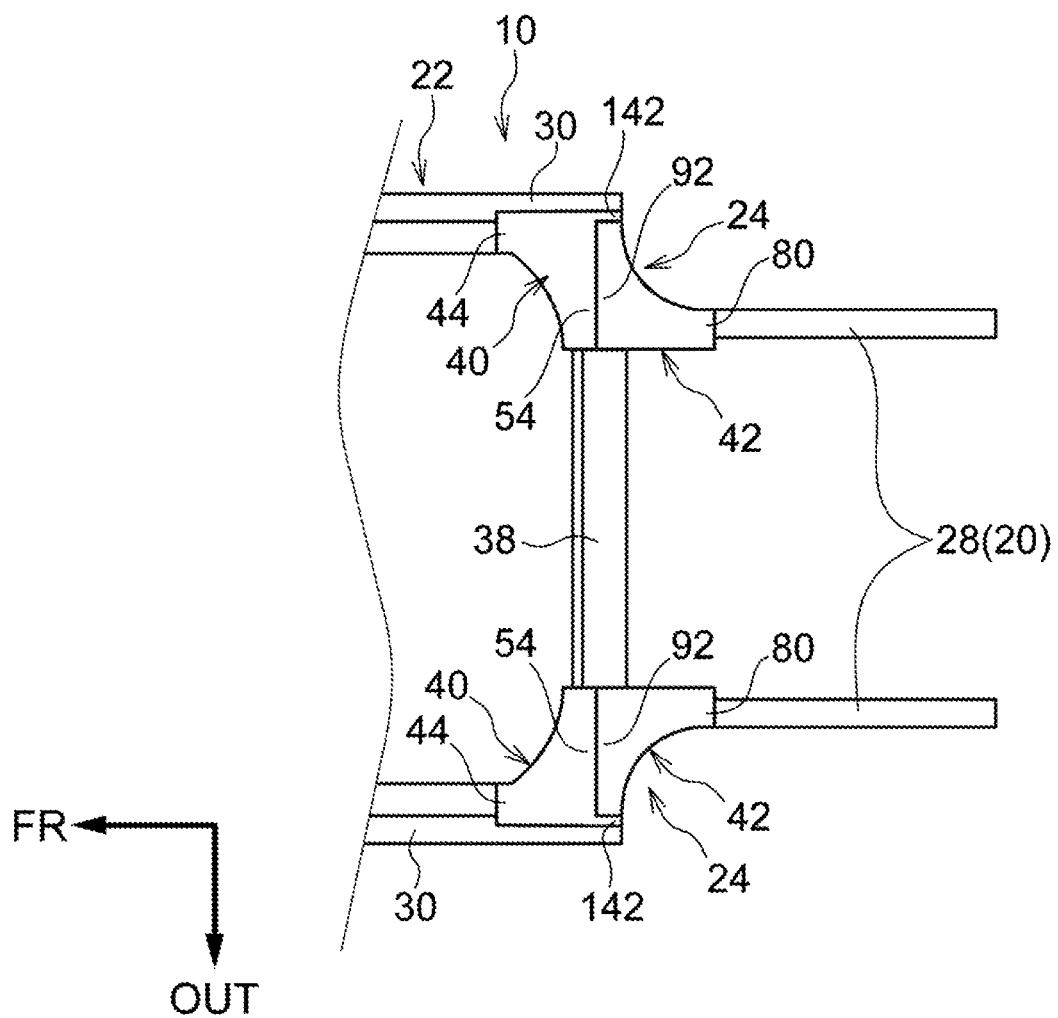
FIG. 6 is a schematic plan view illustrating a coupling section of a vehicle framework structure according to a modified example of the first exemplary embodiment.

In the present exemplary embodiment, configuration is made in which the first configuration member 40 and the second configuration member 42 of the coupling section 24 are joined together at the joining wall portions 56, 90. However, there is no limitation thereto, and as illustrated in FIG. 6, for example, configuration may be made in which a projection 142 is formed projecting out from a vehicle width direction outer side of the first configuration member 40 toward the vehicle rear, with the projection 142 being abutted against or joined to a vehicle width direction outer side of the second configuration member 42. Namely, the projection 142 projects out toward the second configuration member 42 of the coupling section 24, and since the projection 142 overlaps with the second configuration member 42 in the vehicle width direction, when load is input to one of the first configuration member 40 or the second configuration member 42 substantially along the vehicle width direction, the second configuration member 42 and the projection 142 abut one another, thereby enabling the load to be transmitted. This thereby enables shear deformation of the coupling sections 24 to be suppressed.

Note that here, configuration is made in which the projection 142 is provided to the first configuration member 40. However, there is no limitation thereto, and configuration may be made in which the projection 142 is provided to the second configuration member 42 so as to project out toward the first configuration member 40. Moreover, the projection 142 is disposed at the vehicle width direction outer side of the first configuration member 40. However, there is no limitation thereto, and the projection 142 may be disposed at the vehicle width direction inner side of the first configuration member 40, or may be disposed upper side and/or lower side of the first configuration member 40 in the vehicle vertical direction.

Second Exemplary Embodiment

Next, explanation follows regarding a vehicle framework structure according to a second exemplary embodiment of the present invention, with reference to FIG. 7 to FIG. 10. Note that configuration portions that are basically the same as those of the first exemplary embodiment described above are allocated the same reference numerals, and explanation thereof is omitted.

The vehicle framework structure according to the second exemplary embodiment has the same basic configuration as the first exemplary embodiment, but is distinctive in the point that a hollow portion 152 is provided inside a coupling section 150.

Figure 7:
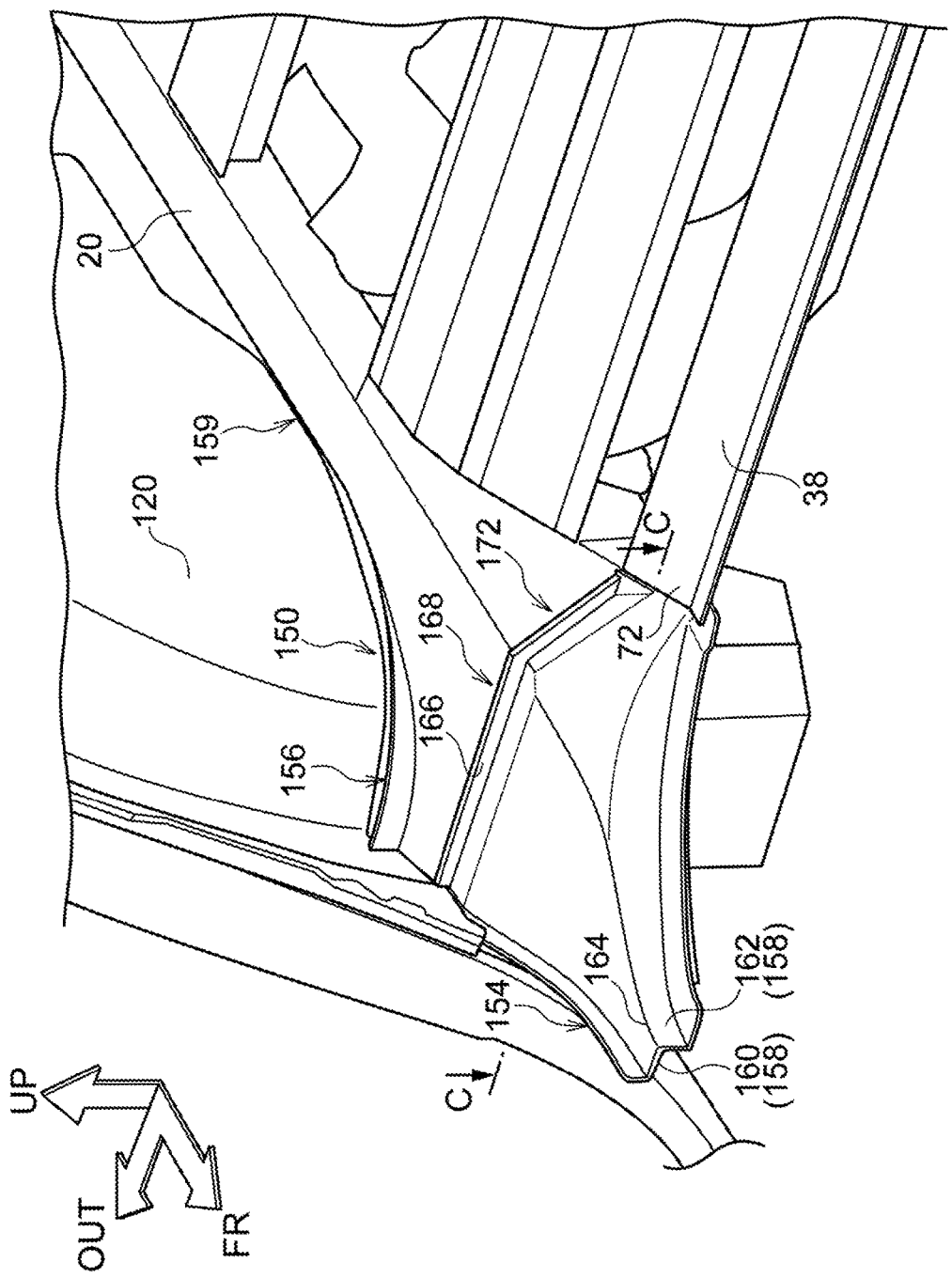
FIG. 7 is a perspective view illustrating relevant portions of a vehicle framework structure according to a second exemplary embodiment, in a state viewing from the vehicle front toward the vehicle rear.

Namely, as illustrated in FIG. 7, a pair of left and right coupling sections 150 are each configured including a first configuration member 154 and a second configuration member 156. The first configuration member 154 is disposed on the intermediate frame 22 side (not illustrated in FIG. 7), and is formed with a substantially L-shaped profile in vehicle front view. A base end portion 158 configuring the vehicle front of the first configuration member 154 is formed with a substantially L-shaped profile in vehicle front view by a horizontal wall portion 160 with a plate thickness direction in the vehicle vertical direction, and a vertical wall portion 162 with a plate thickness direction in the vehicle width direction. The base end portion 158 is joined to the rocker 30 in a state in which a ridge line 164 between the horizontal wall portion 160 and the vertical wall portion 162 of the base end portion 158 is substantially superimposed on the ridge line 52 (see FIG. 2) at the upper face of the rocker 30. Note that the horizontal wall portion 160 and the vertical wall portion 162 extend toward the vehicle rear and are joined to a joining wall portion 166, described later.

Figure 8:
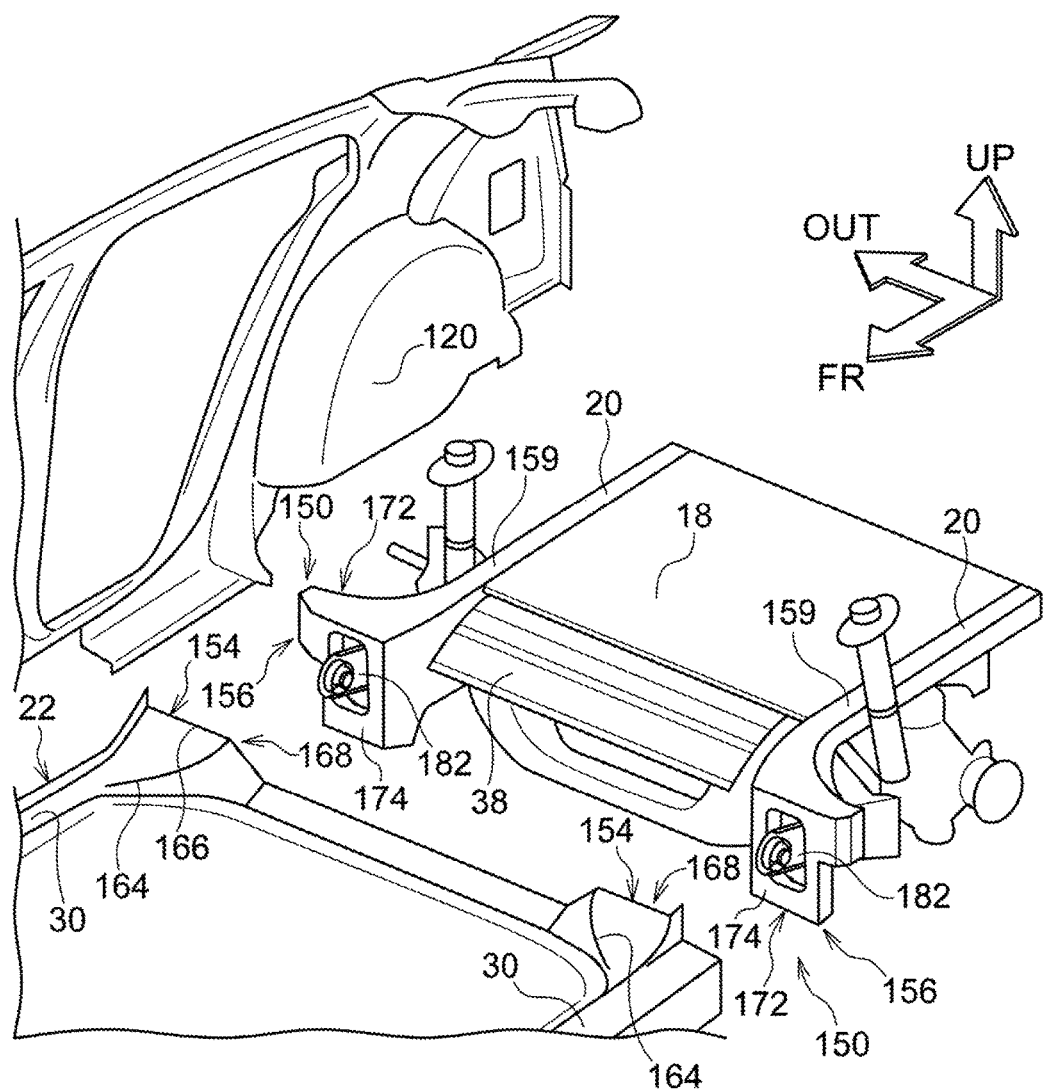
FIG. 8 is an exploded perspective view illustrating relevant portions of a vehicle framework structure according to the second exemplary embodiment, in a state viewing from the vehicle front toward the vehicle rear.

As illustrated in FIG. 8, a leading end portion 168 on the opposite side of the first configuration member 154 to the base end portion 158 is configured including the joining wall portion 166 that has a plate thickness direction in the vehicle front-rear direction. In vehicle front view, the joining wall portion 166 is set with larger dimensions in the vehicle vertical direction and the vehicle width direction than the base end portion 158, and vehicle rear end portions of the horizontal wall portion 160 and the vertical wall portion 162 are respectively joined to the vicinity of a vehicle upper end portion of the joining wall portion 166. Accordingly, the horizontal wall portion 160 is curved toward the vehicle upper side on progression from the base end portion 158 toward the leading end portion 168, and the vertical wall portion 162 is curved toward the vehicle width direction inner side on progression from the base end portion 158 toward the leading end portion 168. The base end portion 158 and the leading end portion 168 (joining wall portion 166) are thus formed as a single body.

Moreover, the length direction end portion 72 of the rear cross member 38 is joined to the vehicle width direction inner side of the first configuration member 154 so as to be superimposed thereon from the vehicle upper side.

The second configuration member 156 is disposed at the vehicle rear of the first configuration member 154, and is formed with a substantially L-shaped profile in plan view of the vehicle. A base end portion 159 of the second configuration member 156 is, for example, integrally formed to the rear frame 20 disposed at the vehicle rear of the second configuration member 156. Note that the second configuration member 156 of a non-illustrated coupling section provided with front-rear symmetry is integrally formed to the front frame 16.

As illustrated in FIG. 8, similarly to the first configuration member 154, a leading end portion 172 of the second configuration member 156 is configured including a joining wall portion 174 with a plate thickness direction in the vehicle front-rear direction. The joining wall portion 174 is formed with substantially the same shape as the joining wall portion 166 of the first configuration member 154 in vehicle front view. The joining wall portion 174 is set with larger dimensions in the vehicle vertical direction and the vehicle width direction than the base end portion 159 of the second configuration member 156.

Figure 9:
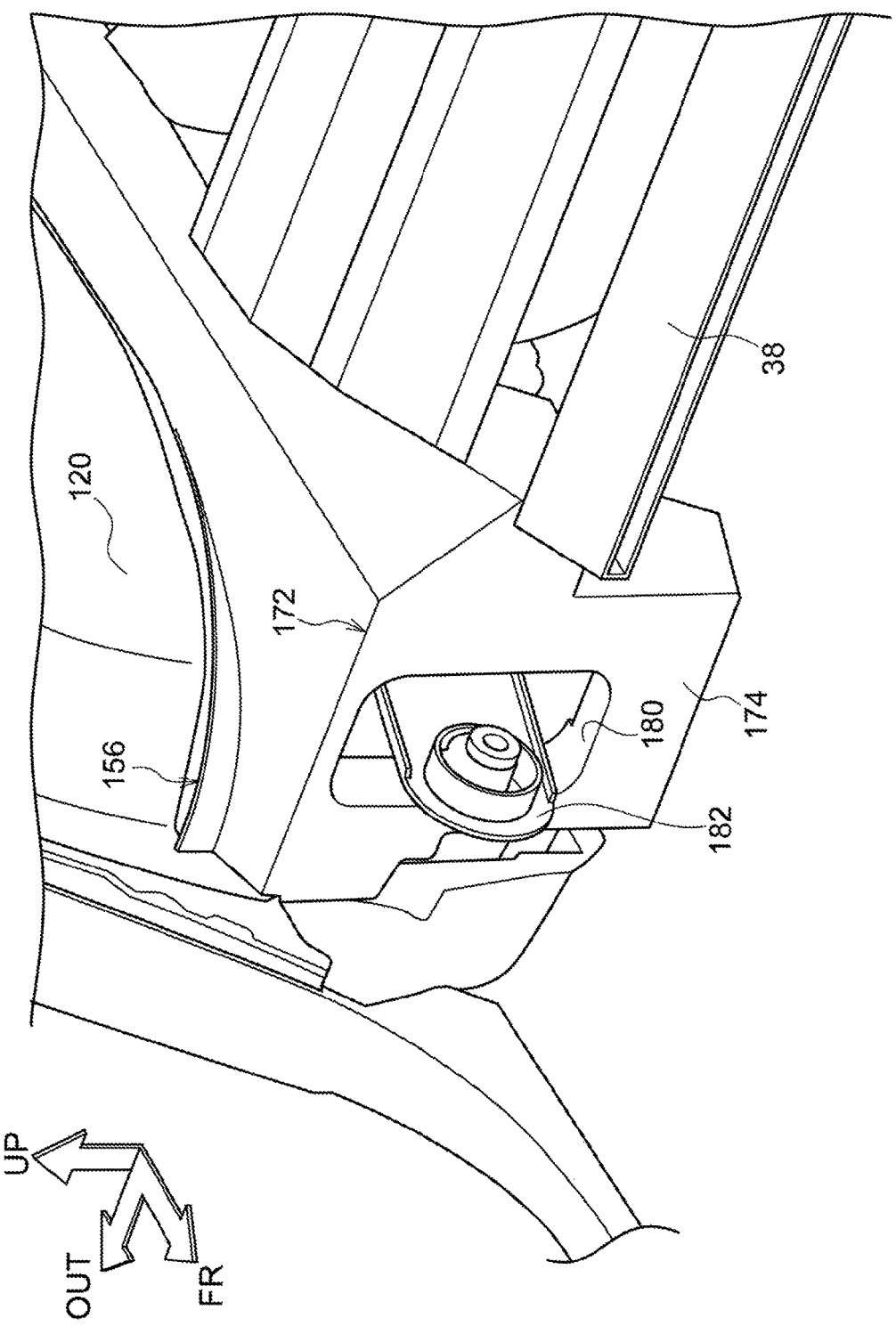
FIG. 9 is an exploded perspective view illustrating a second configuration member of a vehicle framework structure according to the second exemplary embodiment, in a state viewing from the vehicle front toward the vehicle rear.
Figure 10:
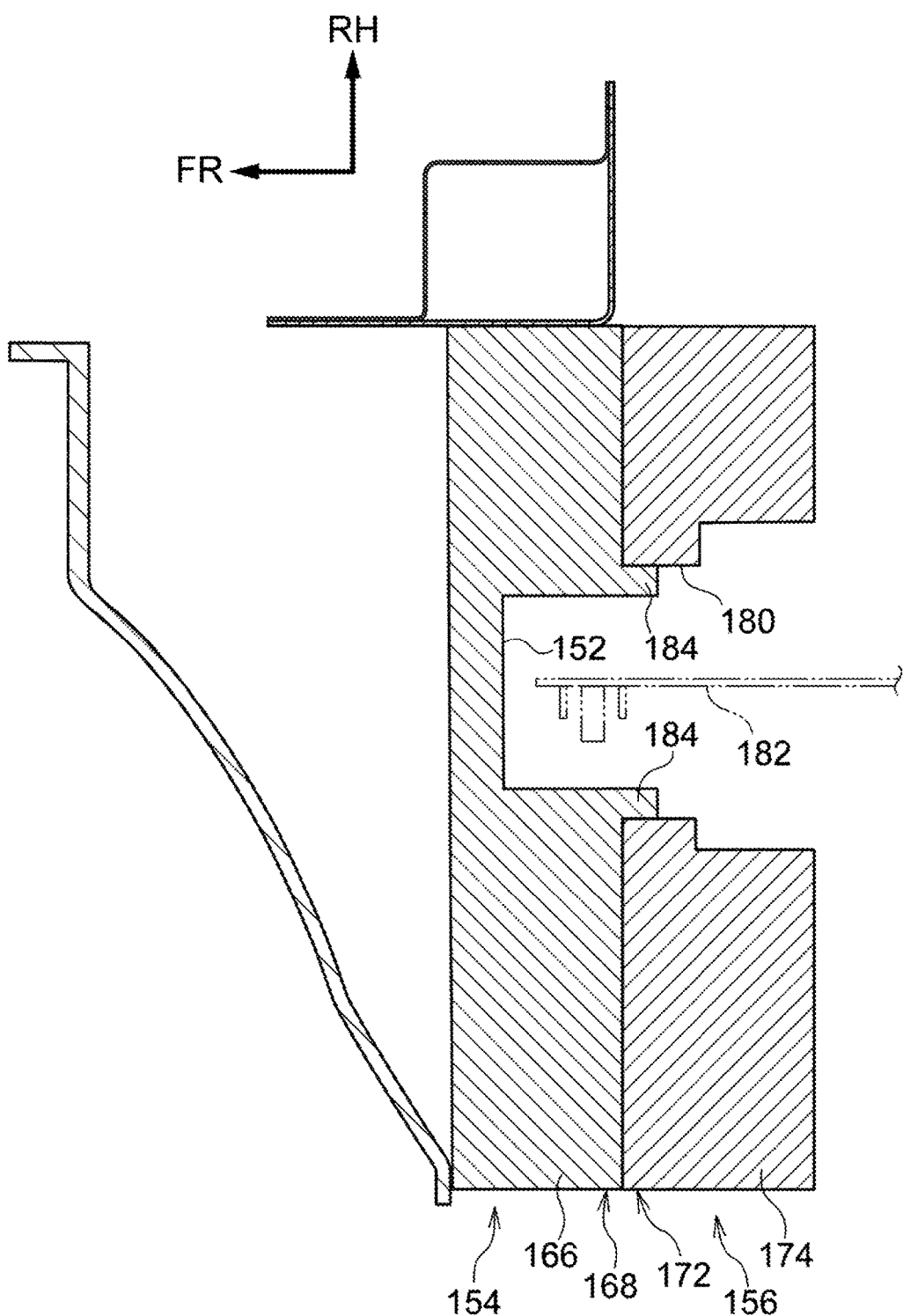
FIG. 10 is an enlarged cross-section illustrating a state sectioned along line C-C in FIG. 7.

As illustrated in FIG. 9, the joining wall portion 174 of the second configuration member 156 is formed with a through hole 180 that serves as an opening and as a fitted-to portion, and that penetrates the joining wall portion 174 in the plate thickness direction. Moreover, as illustrated in FIG. 10, the first configuration member 154 is formed with the hollow portion 152 that is open toward the vehicle rear at a position corresponding to the through hole 180. A portion of a suspension arm 182 is inserted toward the vehicle front into the through hole 180 and the hollow portion 152.

An outer peripheral edge of the hollow portion 152 projects out toward the vehicle rear and is inserted into the through hole 180 of the second configuration member 156, and is provided with a fitting portion 184 that abuts against an inner peripheral wall face of the through hole 180 in the second configuration member 156.

Operation and Advantageous Effects of the Second Exemplary Embodiment

Next, explanation follows regarding operation and advantageous effects of the present exemplary embodiment.

With the exception of the point that the hollow portion 152 is provided inside the coupling section 150, the configuration described above is similar to the vehicle framework structure of the first exemplary embodiment, and is thereby capable of obtaining the same advantageous effects as the first exemplary embodiment.

Moreover, the weight of the coupling section can be reduced as a result of forming the hollow portion 152 and the through hole 180 in the coupling section 150. This thereby enables a reduction in weight.

Moreover, a portion of the suspension arm 182 is inserted into the hollow portion 152 and the through hole 180 of the coupling section 150, thereby enabling space to be saved. This thereby enables more efficient utilization of space in the vehicle.

Moreover, in the coupling section 150, the fitting portion 184 is formed at one of the first configuration member 154 or the second configuration member 156, and the through hole 180, into which the fitting portion 184 is fitted by being inserted in the vehicle front-rear direction, is formed at the other of the first configuration member 154 or the second configuration member 156. Accordingly, when connecting the first configuration member 154 and the second configuration member 156 together, positioning of the first configuration member 154 and the second configuration member 156 can be performed easily by inserting the fitting portion 184 into the through hole 180. Moreover, since it is possible for load to be transmitted either from the fitting portion 184 to the through hole 180 or from the through hole 180 to the fitting portion 184, when load is input to one of the first configuration member 154 or the second configuration member 156 substantially along the vehicle vertical direction or substantially along the vehicle width direction, the load can be better transmitted to the other out of the first configuration member 154 or the second configuration member 156. This thereby enables the load transmission efficiency to be improved for load input in any direction.

Moreover, the second configuration member 156 of the coupling section 150 is formed as a single body with at least one of the front frame 16 or the rear frame 20, rendering an operation to attach the second configuration member 156 to at least one of the front frame 16 or the rear frame 20 unnecessary. A reduction in the number of assembly processes can accordingly be achieved. This thereby enables an improvement in productivity.

Note that in the second exemplary embodiment described above, configuration is made in which the hollow portion 152 is formed in the first configuration member 154. However, there is no limitation thereto, and the hollow portion 152 may be provided in the second configuration member 156, or hollow portions 152 may be provided in both the first configuration member 154 and the second configuration member 156. Moreover, a member other than the suspension arm 182 may be inserted into the hollow portion 152, or configuration may be made in which nothing is inserted into the hollow portion 152.

Moreover, configuration is made in which the fitting portion 184 is provided to the first configuration member 154, and is fitted into the through hole 180 in the second configuration member 156. However, there is no limitation thereto, and configuration may be made in which a fitting hole, not illustrated in the drawings, is formed in the second configuration member 156 for the fitting portion 184, and the fitting portion 184 is fitted into the fitting hole. Moreover, configuration may be made in which the fitting portion 184 is provided to the second configuration member 156 and is fitted together with the hollow portion 152 formed in the first configuration member 154, or with another fitting hole, not illustrated in the drawings, formed in the first configuration member 154.

Moreover, in the first and second exemplary embodiments described above, configuration is made in which in each of the coupling sections 24, 32, 150, the cross member is attached to the first configuration member 40, 154. However, there is no limitation thereto, and configuration may be made in which the cross member is attached to the second configuration member 42, 156. Moreover, configuration may be made in which the cross member is not attached to the coupling sections 24, 32, 150.

Moreover, configuration is made in which the first configuration member 40, 154 and the second configuration member 42, 156 gradually increase in size in the vehicle vertical direction and in the vehicle width direction on progression from the base end portion 44, 80, 158, 159 toward the leading end portion 54, 92, 168, 172. However, there is no limitation thereto, and configuration may be made in which the gradual increase in size is only in at least one of the vehicle vertical direction or the vehicle width direction.

Moreover, in the first configuration member 40, 154, the base end portion 44 that is joined to the rocker 30, and the portion of the first configuration member 40, 154 that is joined to the cross member, are configured as a single body so as not to form joins. However, there is no limitation thereto, and configuration may be made in which these portions are each configured by separate bodies with a join present therebetween.

Moreover, some ridge lines of the plural ridge lines of the joining wall portion 56, 166 of the first configuration member 40, 154 are disposed so as to be continuous with the ridge lines of the joining wall portion 90, 174 of the opposing second configuration member 42, 156. However, there is no limitation thereto, and these ridge lines may be non-continuous with each other.

Moreover, configuration is made in which at least one ridge line of each of the coupling sections 24, 32, 150 is continuous with at least one ridge line of the front frame 16, the rear frame 20, or the intermediate frame 22. However, there is no limitation thereto, and these ridge lines may be non-continuous with each other.

Although explanation has been given regarding exemplary embodiments of the present invention, is the present invention is not limited to the above, and obviously various modifications other than the above may be implemented in a range that does not depart from the spirit of the present invention.

What is claimed is:

1. A vehicle framework structure, comprising:
   a front frame that configures a part of a framework of a vehicle front section;
   a rear frame that configures a part of a framework of a vehicle rear section;
   an intermediate frame that configures a part of a framework of a vehicle intermediate section, and that includes a framework member disposed between the front frame and the rear frame and having a length direction in a vehicle front-rear direction; and
   a coupling section that includes a first configuration member attached to the framework member of the intermediate frame so as to be continuous with the framework member in the vehicle front-rear direction, the first configuration member having a leading end portion and a base end portion, and a second configuration member attached to the first configuration member so as to be continuous with the first configuration member in the vehicle front-rear direction, the second configuration member having a leading end portion and a base end portion, the coupling section coupling at least one of the front frame or the rear frame to the intermediate frame in the vehicle front-rear direction by joining the leading end portion of the first configuration member to the leading end portion of the second configuration member opposing the leading end portion of the first configuration member, with both the first configuration member and the second configuration member being formed so as to gradually increase in size in at least one of a vehicle width direction or a vehicle vertical direction on progression from the respective base end portions of the first configuration member and the second configuration member toward the respective leading end portions of the first configuration member and the second configuration member,
   wherein the coupling section is formed with at least one of a hollow portion or an opening, and
   wherein a portion of a suspension arm is inserted into the at least one of the hollow portion or the opening.

2. The vehicle framework structure of claim 1, wherein the intermediate frame includes:
   a pair of left and right rockers that constitute the framework member; and
   a cross member coupling the pair of left and right rockers together in the vehicle width direction via the first configuration member of the coupling section.

3. The vehicle framework structure of claim 2, wherein a portion of the first configuration member of the coupling section that is joined to one of the pair of left and right rockers, and a portion of the first configuration member of the coupling section that is joined to the cross member, are configured as a single body.

4. The vehicle framework structure of claim 1, wherein, in the coupling section, at least one ridge line, of a plurality of ridge lines extending along the vehicle front-rear direction in the vicinity of the leading end portion of the first configuration member, is disposed so as to be continuous with at least one ridge line of a plurality of ridge lines extending along the vehicle front-rear direction in the vicinity of the leading end portion of the second configuration member.

5. The vehicle framework structure of claim 1, wherein, in a vehicle front view of the coupling section, at least one ridge line, of a plurality of ridge lines within a face of the leading end portion of the first configuration member that is a face opposing the second configuration member, is disposed so as to be substantially superimposed on at least one ridge line of a plurality of ridge lines within a face of the leading end portion of the second configuration member that is a face opposing the first configuration member.

6. The vehicle framework structure of claim 1, wherein the first configuration member and the second configuration member of the coupling section are each formed with a rib extending along the vehicle front-rear direction, and the rib of the first configuration member and the rib of the second configuration member are disposed so as to be substantially superimposed on each other in a vehicle front view.

7. The vehicle framework structure of claim 1, wherein at least one of the first configuration member or the second configuration member of the coupling section is provided with a projection that projects toward the other of the first configuration member or the second configuration member, and that overlaps the other of the first configuration member or the second configuration member in the vehicle width direction.

8. The vehicle framework structure of claim 1, wherein a fitting portion is formed at one of the first configuration member or the second configuration member of the coupling section, and a fitted-to portion is formed at the other of the first configuration member or the second configuration member, with the fitting portion being fitted to the fitted-to portion by being inserted into the fitted-to portion in the vehicle front-rear direction.

9. The vehicle framework structure of claim 1, wherein the second configuration member of the coupling section is formed as a single body with at least one of the front frame or the rear frame.

10. The vehicle framework structure of claim 1, wherein at least one ridge line of a plurality of ridge lines provided at the coupling section is configured so as to be continuous with at least one ridge line of a plurality of ridge lines provided at either the front frame or the rear frame.

11. The vehicle framework structure of claim 1, wherein the first configuration member and the second configuration member of the coupling section are fastened together using a fastener.

* * * * *